A. G. Good,
Bread Machine.

No. 91,432. Patented June 15, 1869.

Witnesses.

Inventor,
A. G. Good.
Chipman, Hosmer & Co
Atty.

United States Patent Office.

A. G. GOOD, OF READING, PENNSYLVANIA.

Letters Patent No. 91,432, dated June 15, 1869.

IMPROVED DEVICE FOR RAISING AND KNEADING BREAD.

The Schedule referred to in these Letters Patent and making part of the same.

*To all whom it may concern:*

Be it known that I, A. G. GOOD, of Reading, in the county of Berks, and State of Pennsylvania, have invented a new and valuable Improvement in Devices for Raising and Kneading Bread; and I do hereby declare that the following is a full, clear, and exact description of the construction and operation of the same, reference being had to the annexed drawings, making a part of this specification, and to the letters and figures of reference marked thereon.

Figure 1:
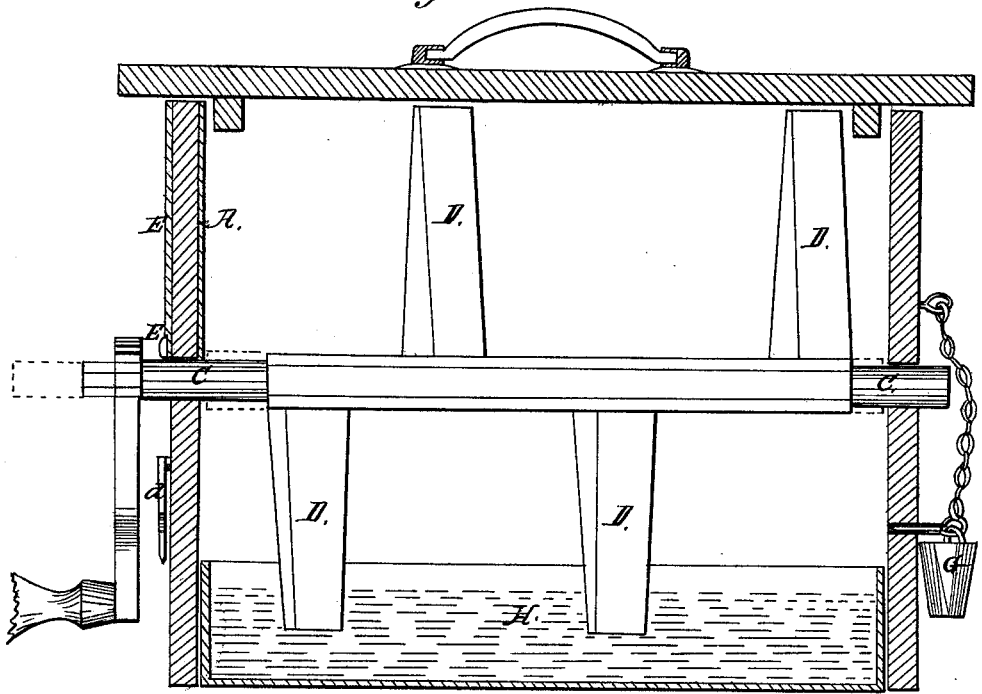

Figure 1, of the drawings, is a representation of a longitudinal section of my machine.

Figure 2:
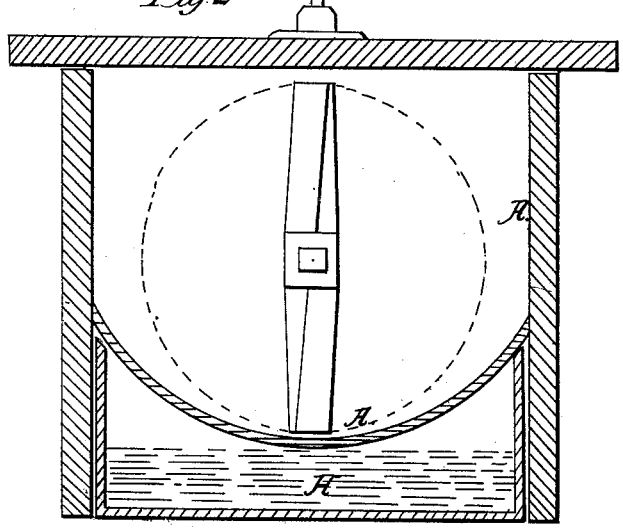

Figure 2 is a vertical sectional view of the same.

My invention relates to means for manufacturing bread; and

It consists in the construction and novel arrangement of devices for kneading flour into dough, and aiding in the process of raising the same, preparatory to baking.

To this end, I construct a box, with a suitable lid, adapted to fit closely and exclude the air. I line the interior of this box with zinc, as shown on the drawings, leaving a space at the bottom, for purposes hereinafter mentioned.

The zinc lining is represented on the drawings by the letter A.

Other materials, such as tin, or iron, may be used; but, for many purposes, zinc is preferable.

The lower part of this lining is made concave, as shown.

The letter C represents a shaft, operated by a crank, as shown, and to which is attached a series of beaters, marked D, arranged on said shaft in a diagonal position, as represented.

This shaft works in bearings in the ends of the box, and is made removable by means of a wedge, E, fitted in a suitable slot in one end of the box, above the shaft, and extending from the top of the box to said shaft.

When the shaft is removed from the box, I fill the openings, left thereby in the ends of said box, by means of the stoppers, marked G. By the use of these stoppers, air may be admitted or excluded from the box at will.

Beneath the lining A, I place a pan, marked H, to contain warm water, which I use, when desirable, to aid in the process called "raising the dough."

The flour is mixed and kneaded in the box by means of the revolving beaters, and then the shaft is removed, and the openings closed by means of the stoppers. The pan H is then filled with warm or hot water, and the dough left to raise. The result is a rapid distribution of carbonic-acid gas from the leaven throughout the dough, and the same is made ready for the oven in a very brief space of time.

To hold the wedge E in place, I affix hooks, marked d, to the ends of the box, which fit in suitable openings in the bottom of said wedges.

What I claim as my invention, and desire to secure by Letters Patent, is—

A bread-kneading and raising apparatus, having lining A, shaft C with its beaters, wedge E, stoppers G, and pan H, constructed, arranged, and operating substantially as specified.

In testimony that I claim the above, I have hereunto subscribed my name, in the presence of two witnesses.

A. G. GOOD.

Witnesses:
O. M. BRADY,
ROBT. SNODGRASS.